(12) United States Patent
Dotey

(10) Patent No.: US 9,907,372 B2
(45) Date of Patent: Mar. 6, 2018

(54) PORTABLE ORGANIZATION BAG WITH REMOVABLE POCKETS

(71) Applicant: Patrick Neil Dotey, Palm Beach Gardens, FL (US)

(72) Inventor: Patrick Neil Dotey, Palm Beach Gardens, FL (US)

( * ) Notice: Subject to any disclaimer, the term of this patent is extended or adjusted under 35 U.S.C. 154(b) by 0 days.

(21) Appl. No.: 15/395,368

(22) Filed: Dec. 30, 2016

(65) Prior Publication Data
US 2017/0188674 A1    Jul. 6, 2017

Related U.S. Application Data

(60) Provisional application No. 62/273,123, filed on Dec. 30, 2015.

(51) Int. Cl.
| | |
|---|---|
| *A45C 7/00* | (2006.01) |
| *A45C 3/02* | (2006.01) |
| *A45C 13/02* | (2006.01) |
| *A45F 3/02* | (2006.01) |
| *B60R 7/04* | (2006.01) |
| *A45C 9/00* | (2006.01) |

(52) U.S. Cl.
CPC .............. *A45C 7/0095* (2013.01); *A45C 3/02* (2013.01); *A45C 7/0086* (2013.01); *A45C 9/00* (2013.01); *A45C 13/02* (2013.01); *A45F 3/02* (2013.01); *B60R 7/043* (2013.01); *A45C 2009/007* (2013.01); *A45F 2200/0575* (2013.01)

(58) Field of Classification Search
CPC ............. B60R 7/043; B60R 2011/0017; B60R 2011/0059; B60R 2011/0276; B60R 2011/0015; B60R 11/00; A45C 7/0095; A45C 11/24; A45C 9/00; A45C 3/02; A45C 2009/007; A45F 2200/0575
See application file for complete search history.

(56) References Cited

U.S. PATENT DOCUMENTS

| | | | | |
|---|---|---|---|---|
| 5,020,673 A | * | 6/1991 | Adams ...................... | A45C 3/00 150/112 |
| 5,878,672 A | * | 3/1999 | Ostermann ............ | B60N 3/004 108/25 |
| 2003/0230612 A1 | * | 12/2003 | Santos ..................... | A45C 9/00 224/585 |
| 2006/0283899 A1 | * | 12/2006 | Hill .......................... | B60R 7/043 224/275 |
| 2008/0179924 A1 | * | 7/2008 | Thompson .............. | B60R 7/043 297/188.2 |
| 2009/0091165 A1 | * | 4/2009 | Thompson ............. | A47C 31/11 297/228.12 |

* cited by examiner

*Primary Examiner* — Corey Skurdal
(74) *Attorney, Agent, or Firm* — McHale & Slavin, P.A.

(57) ABSTRACT

A portable organization bag with removable pockets comprises a flexible main body having one or more removable storage compartments. The portable organization bag with removable pockets can be traversed between a first storage position securable to a surface and a second transportable position that can be transported away from the surface. Preferably, the main body comprises a dividing plate which separates the main body into a first portion and second portion.

17 Claims, 21 Drawing Sheets

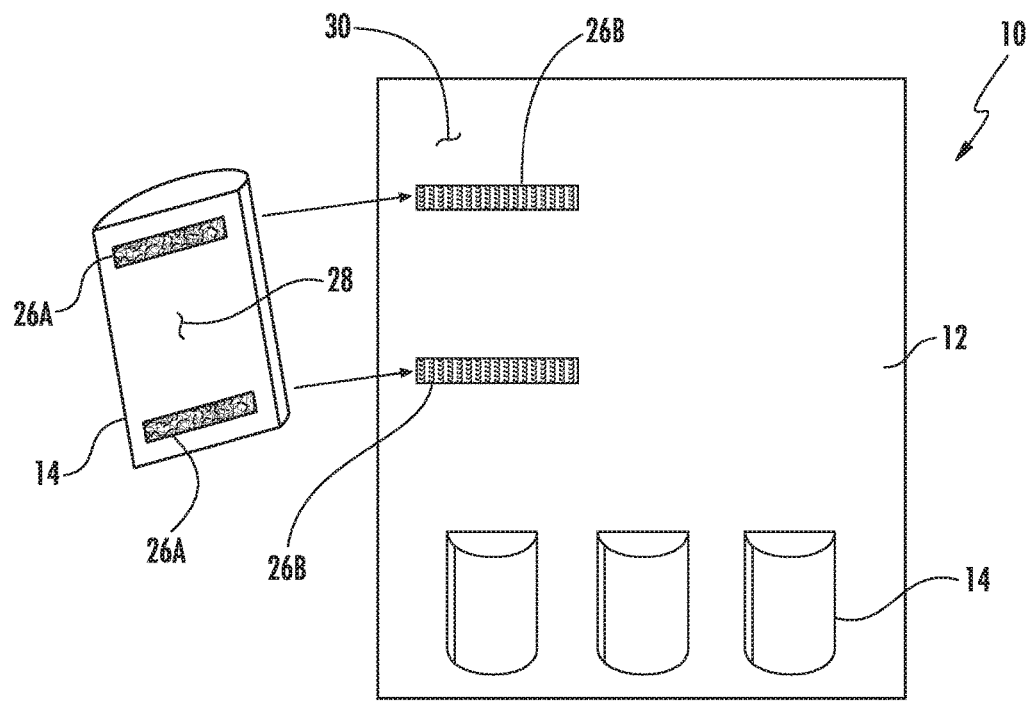
FIG. 3
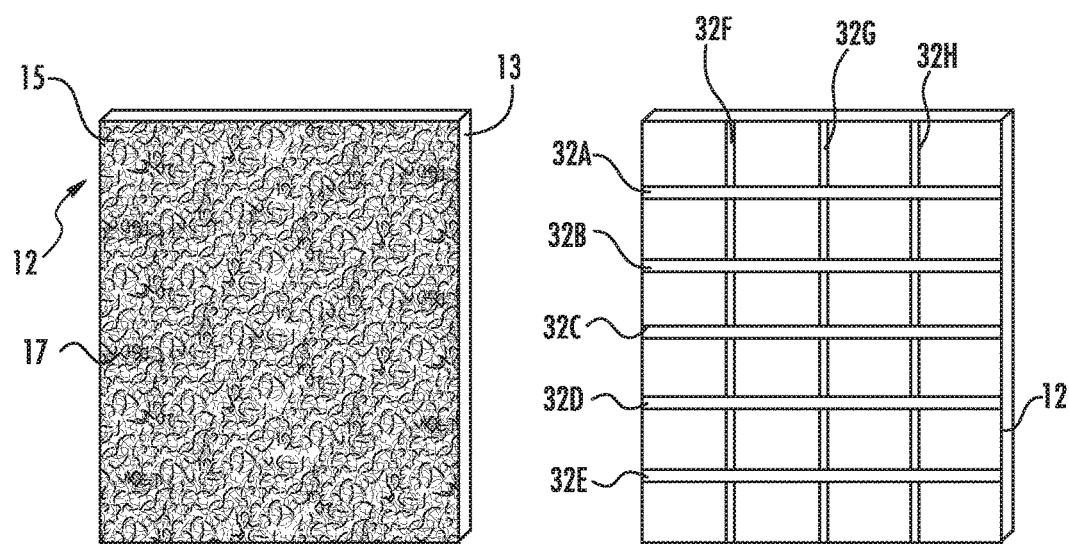
FIG. 4A
FIG. 4B

PORTABLE ORGANIZATION BAG WITH REMOVABLE POCKETS

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/273,123, entitled "PORTABLE ORGANIZATION BAG WITH REMOVABLE POCKETS", filed Dec. 30, 2015. The contents of which the above referenced application is incorporated herein by reference.

FIELD OF THE INVENTION

The present invention relates to an organization and storage device; and more particularly, to a portable storage device that contains one or more removable, independent storage compartments which can be traversed from a first position to a second, transporting position.

BACKGROUND OF THE INVENTION

It is often desirable to store items where they may be most used. While such location is convenient, it may not be the best place to store such items. For those individuals who use tools for business, such tools are often stored in an automobile or truck. One of the drawbacks to keeping tools inside of the automobile or truck is that the large number of tools may prevent use outside of work. A device that allows for tools to be stored in an area for a specified time and easily transported out of the area would be desirable. A device that allows a user to utilize the seat of a vehicle for storage purposes is also desirable.

SUMMARY OF THE INVENTION

The present invention is directed towards a portable organization bag with removable pockets that can be traversed between a first storage position and a second transportable position. The portable organization bag with removable pockets contains a main body having a plurality of removable pockets. Preferably, the main body comprises a dividing plate which separates the main body into a first portion and second portion.

Accordingly, it is an objective of the present invention to provide a portable organization bag with removable pockets.

It is a further objective of the present invention to provide a portable organization bag with removable pockets that is traversable between two positions.

It is yet another objective of the present invention to provide a portable organization bag with removable pockets that can be traversed between a first storage position and a second transportable position.

It is a still further objective of the invention to provide a system comprising two or more independently portable organization bags with removable pockets.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 3 illustrates an embodiment of a securing member for securing a removable pocket to the bag;

FIG. 4A illustrates an embodiment of the portable organization bag with removable pockets having a the main body covered with securing members;

FIG. 4B illustrates an embodiment of the portable organization bag with removable pockets having a plurality of securing members arranged in rows;

DETAILED DESCRIPTION OF THE INVENTION

Figure 2:
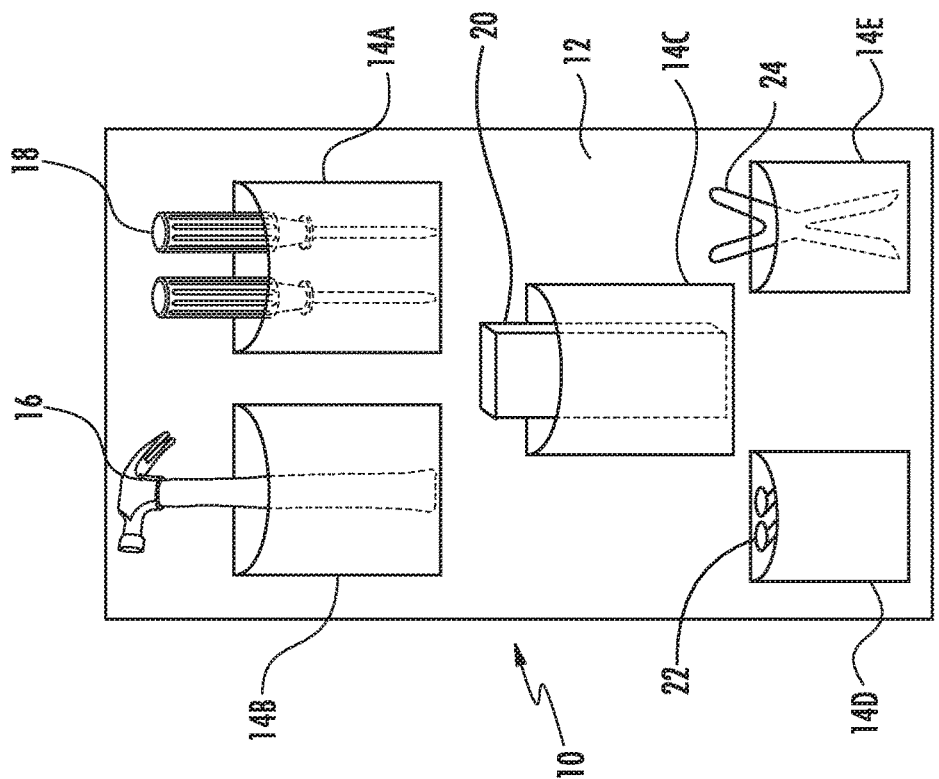
FIG. 2 is an illustrative embodiment of the portable organization bag with removable pockets shown in FIG. 1 with tools inserted into the removable pockets.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 1:
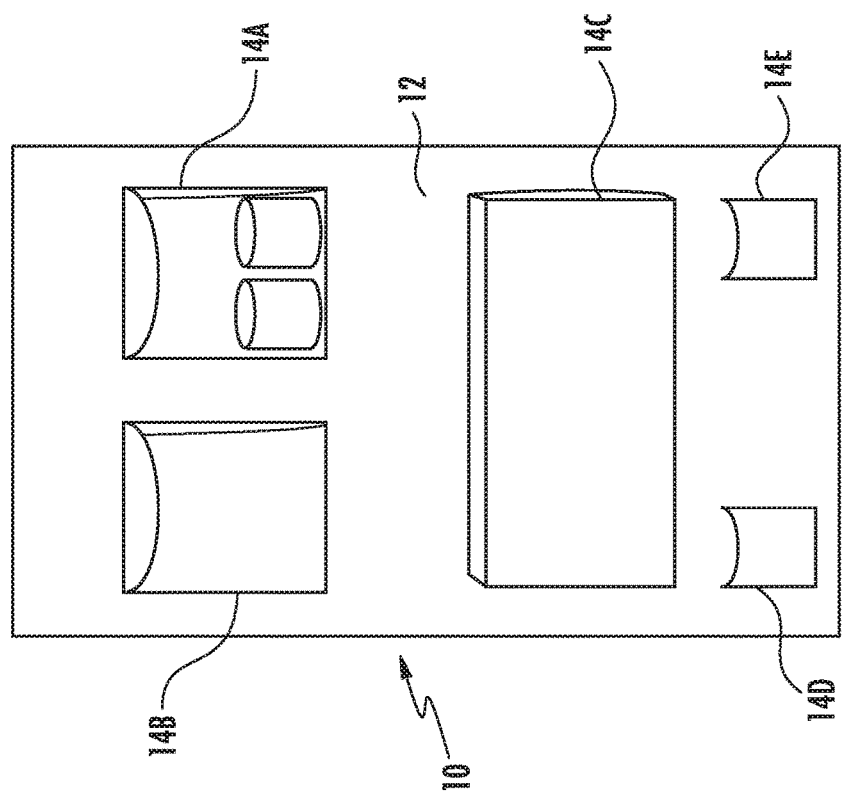
FIG. 1 is an illustrative embodiment of a portable organization bag with removable pockets.

Referring to FIG. 1, an illustrative embodiment of a portable organization bag with removable pockets, referred to generally as a portable organization bag with removable pockets 10. The portable organization bag with removable pockets 10 contains a main body 12 having a plurality of removable pockets 14A, 14B, 14C, 14D, and 14E, referred to generally as removable pocket 14. The main body 12 may be any size and shape, and is preferably made of a hard material, such as a hard plastic (13, see FIG. 4A). The hard plastic may be covered by a have a heavy duty fabric material (15, see FIG. 4A), such as a colored or non-colored canvas fabric, waterproof, 600 denier. Alternatively, main body 12 flexible material, such as a flexible cloth. The pockets may also be made of a flexible cloth material and sized and shaped to hold various objects. Preferably, the pockets 14 include a backing material, such as a hard plastic to prevent the pockets from flopping around. As illustrated in FIG. 2, the removable pockets 14 may contain work tools, such as screw drivers 18 (in removable pocket 14A), a hammer 16 (in removable pocket 14B), a box of gloves 20 (in removable pocket 14C), screws 22 (in removable pocket 14D) or drill bits (not shown), and a pliers 24 (in removable pocket 14E).

The removable pockets 14 are designed to be removably coupled or attached to the main body 12. FIG. 3 shows an embodiment of a removable pocket 14 having a fastening member, illustrated herein as a first portion of hook and loop fastener 26A, such as VELCRO, attached to a back surface 28 of the removable pocket. The first portion of hook and loop fastener 26A secures to a second fastening member, illustrated herein as a second portion of hook and loop fastener 26B, attached to a surface of the main body 12. While the securing members 26A and 26B are shown as hook and loop fasteners, other fastening members such as snaps, buttons, etc. may be used. Preferably, the entire main body 12 will be a VELCRO loop fastener or VELCRO hook fastener, see FIG. 4A, showing VELCRO loops 17. FIG. 4B illustrates an embodiment of the portable organization bag with removable pockets 10 having fastening members arranged as a plurality of rows, 32A-32H. The fastening member rows 32A-32E may be, for example, a strip comprising a portion of hook and loop fastener (VELCRO) secured along a length of the main body (see strips 32F-32H), along the width of the main body 12 (see strips 32A-32E), or combinations thereof.

Figure 5:
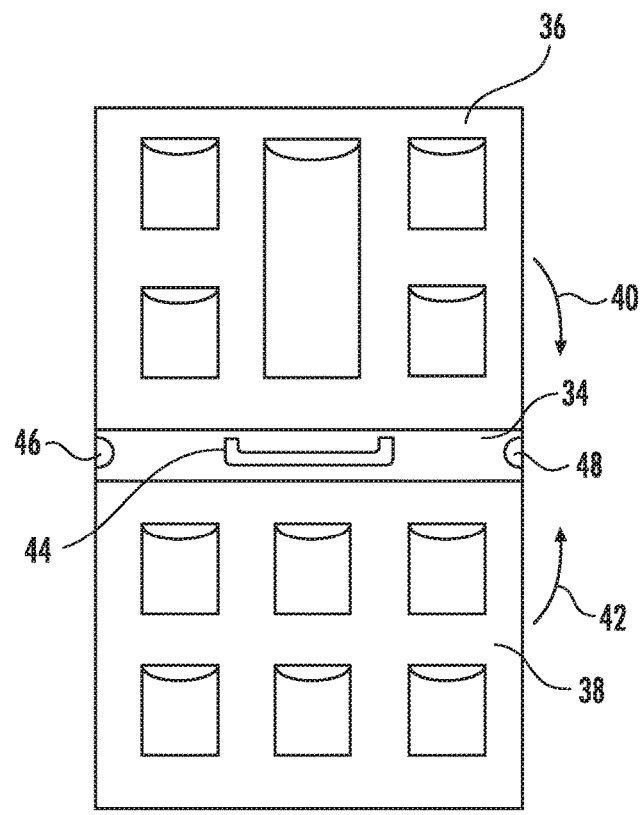
FIG. 5 illustrates an embodiment of the portable organization bag with removable pockets configured to fold into a carrying case.
Figures 6, 7:
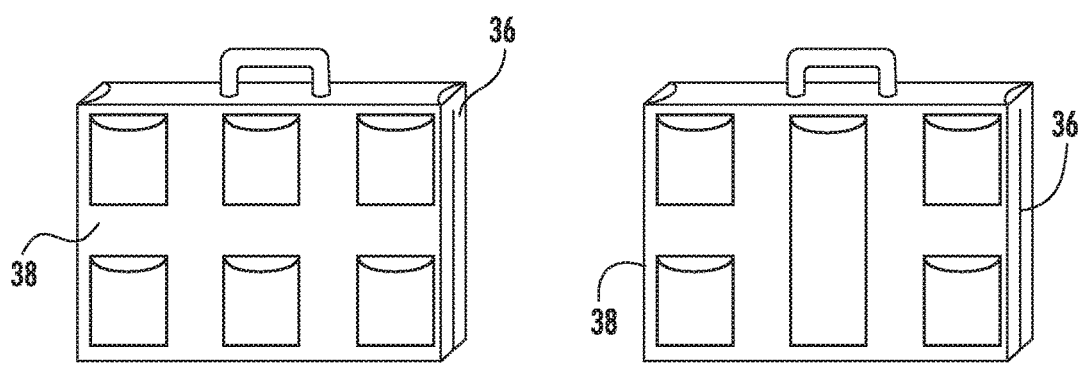
FIG. 6 is a front view of the portable organization bag with removable pockets in a folded position.
FIG. 7 is a back view of the portable organization bag with removable pockets in a folded position.
Figure 8:
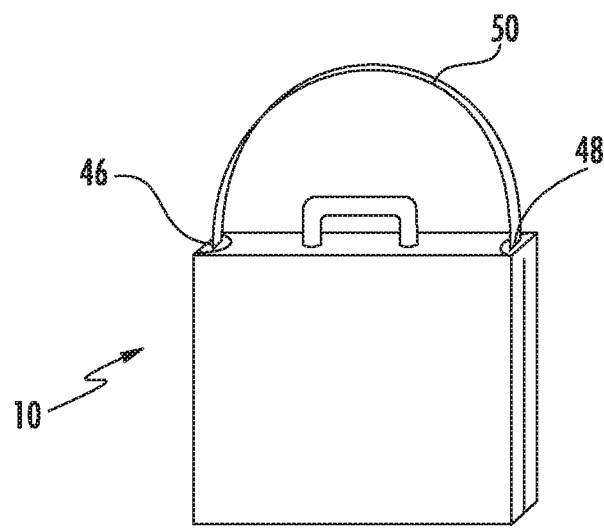
FIG. 8 is front view of the portable organization bag with removable pockets in a folded position with shoulder straps.

The portable organization bag with removable pockets 10 is designed to secure to a surface, such as to a car seat. To prevent the need to remove the entire device, the individual pockets 14 can be removed from the main body 12 and taken to a desired position. In a situation where the entire portable organization bag with removable pockets 10 is required to be utilized at a position away from the surface, i.e. the back seat, a user simply removes the device from the seat and carries it with him/her. Once at a site, individual pockets 14 can be removed from the main body 12 and taken to a desired location within the site. FIGS. 5-7 illustrate the portable organization bag with removable pockets 10 traversed between a first securing position (FIG. 5) to a second transportable position (FIG. 6 and FIG. 7). To aid in providing a supported transportable position, the main body contains a plate 34 made of, for example, plastic or metal, separating the main body 12 into a first portion 36 and a second portion 38. Each of the first portion 36 and the second portion 38 contains the pockets 14. The plate 34 allows the portable organization bag with removable pockets 10 to be manipulated into a carrying bag having removable pockets 14 on each side of the plate 34 by moving each side 36 and 38 inwardly, see arrows 40, 42. FIGS. 6 and 7 illustrate the portable organization bag with removable pockets 10 in the folded state. A flexible handle 44 secured to the plate 34 provides a mechanism for a user to easily and comfortably hold and transport the folded portable organization bag with removable pockets 10. In addition, rings 46 and 48 are used to secure a shoulder strap 50 (FIG. 8) to the portable organization bag with removable pockets 10.

Figure 9:
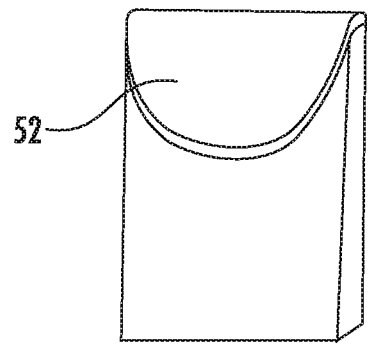
FIG. 9 is an illustrative example of a removable pocket.

Referring to FIG. 9, an alternative example of a pocket 14 is shown. Pocket 14 is illustrated having a flap 52 covering the pocket opening to prevent any tools secured therein from being removed. Pockets 14 may also be constructed to contain fabric on the sides of the flap in order to prevent materials stored inside of the pocket from falling out.

Figure 10:
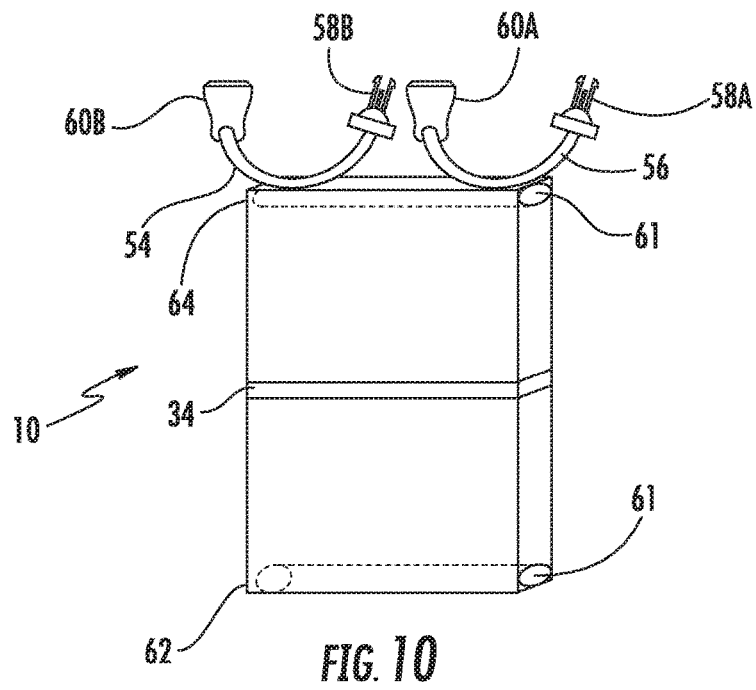
FIG. 10 illustrates the portable organization bag with removable pockets having straps configured to secure to a secondary device.

FIG. 10 illustrates the portable organization bag with removable pockets 10 having a plurality of securing members, shown herein as straps 54 and 56. Each of the straps and 56 include male and female connecting members, illustrated herein as side release buckle having a buckle latch 58A and 58B lockable with a buckle latch body 60A and 60B. Securing the side release buckle lock 58A or 58B into the buckle lock 60A and 60B allows the portable organization bag with removable pockets 10A, 10B, and 10C to be secured to, for example, a car seat head rest. Optionally, the main body 12 may include a support structure, illustrated herein as a plastic cylindrical rod 61, secured at a first end 62 and opposing second end 64. The rod 61 provides a degree of rigidity to the portable organization bag with removable pockets 10.

Figure 11:
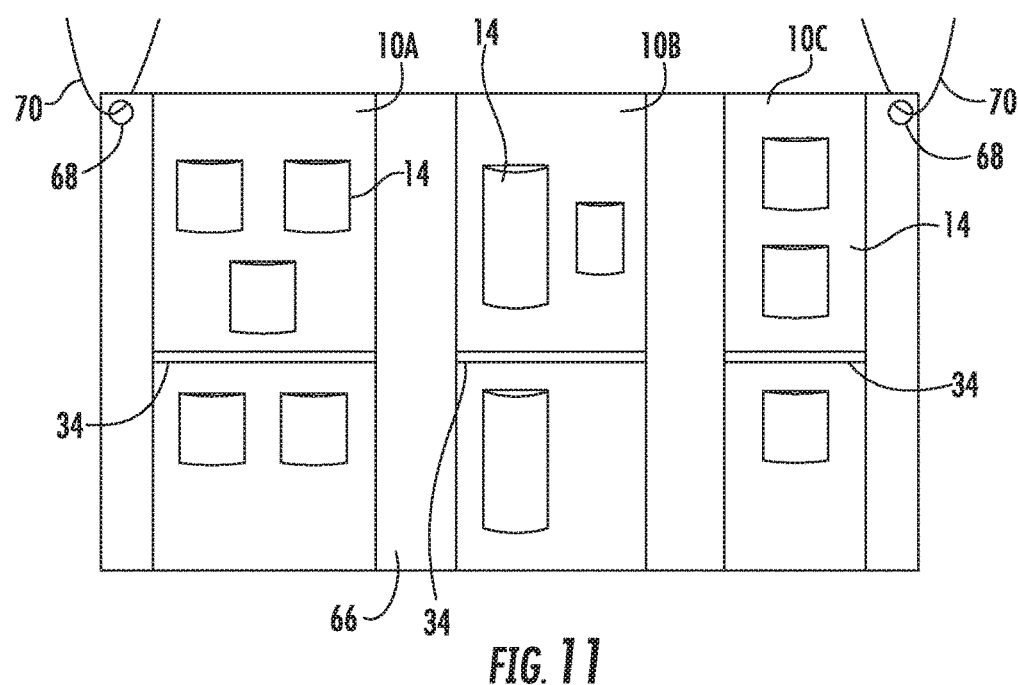
FIG. 11 illustrates a system comprising a plurality of portable organization bags with removable pockets.

FIG. 11 illustrates a system having a plurality of the portable organization bag with removable pockets 10. The system illustrated in FIG. 11 comprises of three portable organization bags with removable pockets 10A, 10B, and 10C removably coupled to secure to a central support member 66. The central support member 66 may be, for example, a semi-rigid or rigid plastic material. The central support member 66 may contain rings 68 sized and shaped to hold straps 70. The straps 70 can be tied around a car seat to secure the central support member 66 to the car seat. Alternatively, strap 70 may contain male/female connecting members. Since each portable organization bag with removable pockets 10A, 10B, and 10C are removeably attached to the central support member 66, each may be removed independently of the others.

Figure 12:
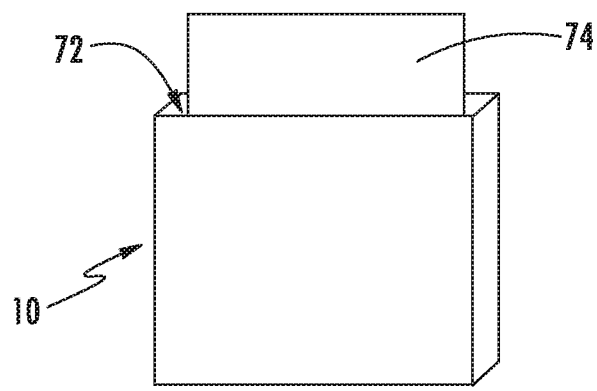
FIG. 12 is an illustrative view of an alternative embodiment of the portable organization bag with removable pockets.

FIG. 12 illustrates an alternative embodiment of the portable organization bag with removable pockets 10. In addition to having one or more structures previously described, the main body 12 may contain an internal space 72 sized and shaped to receive an insert, such as a semi-flexible or flexible plastic sheet 74.

Figure 13:
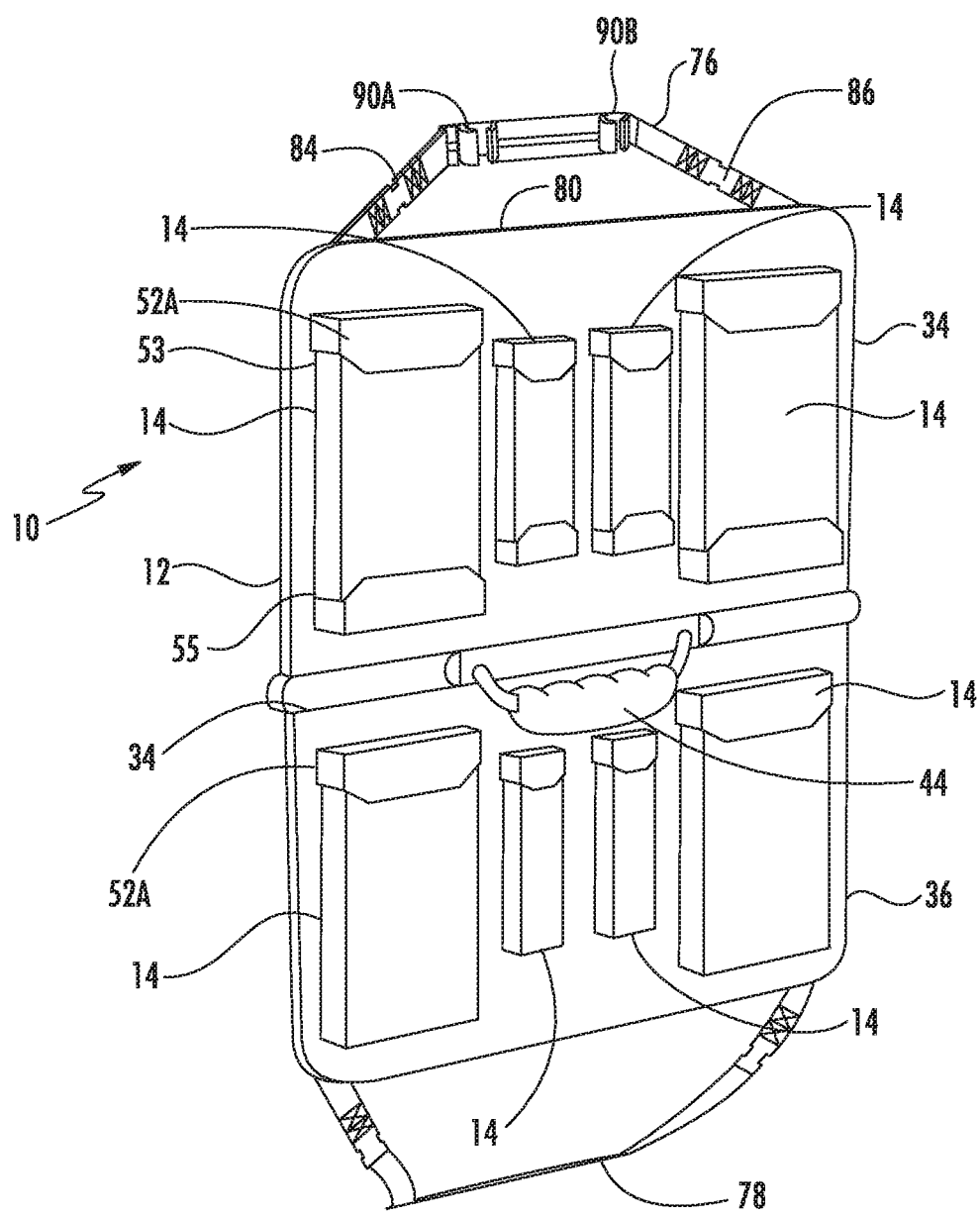
FIG. 13 is an illustrative embodiment of the portable organization bag with removable pockets adaptable to be secured to a portion of a vehicle seat that does not have a headrest.
Figure 14:
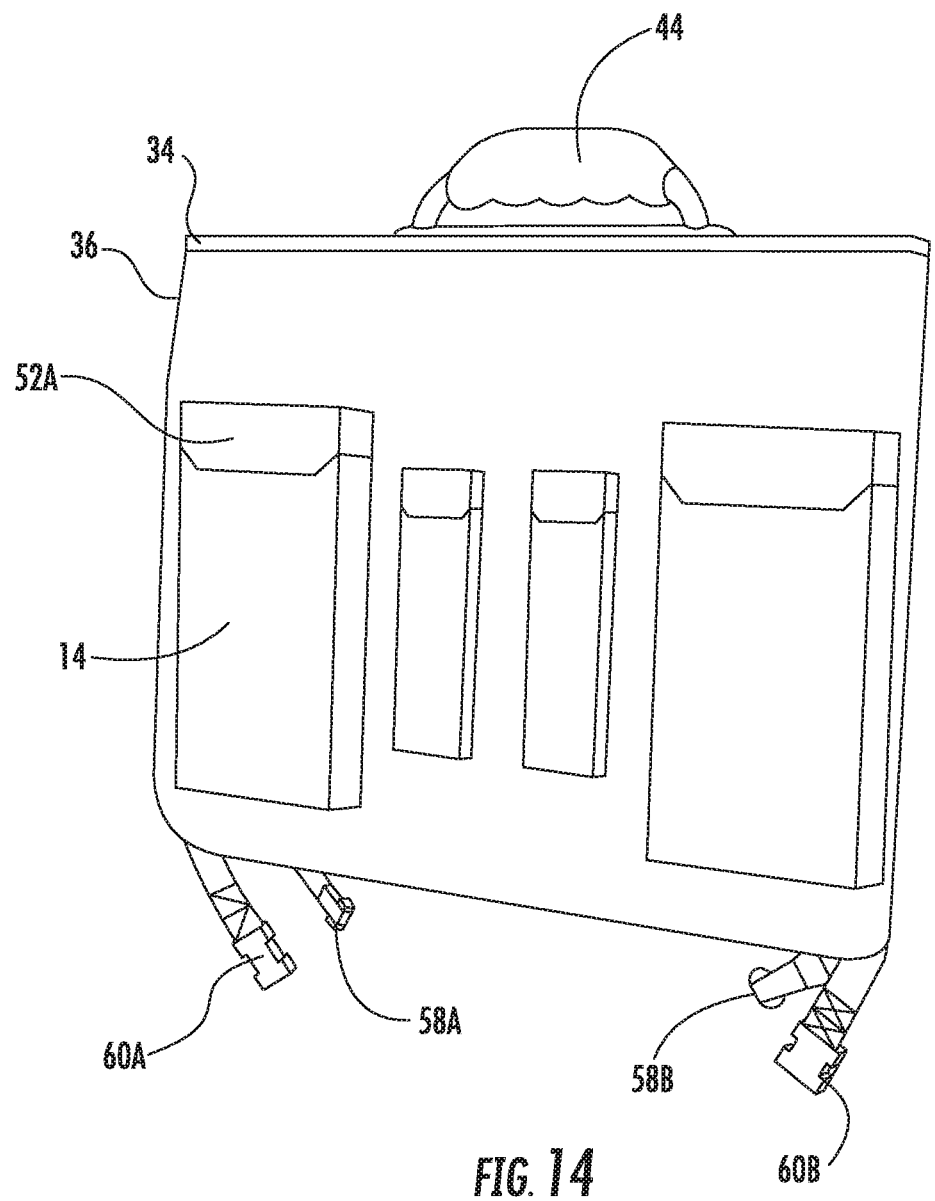
FIG. 14 illustrates the portable organization bag with removable pockets shown in FIG. 13 in a closed, brief case like configuration.
Figure 15:
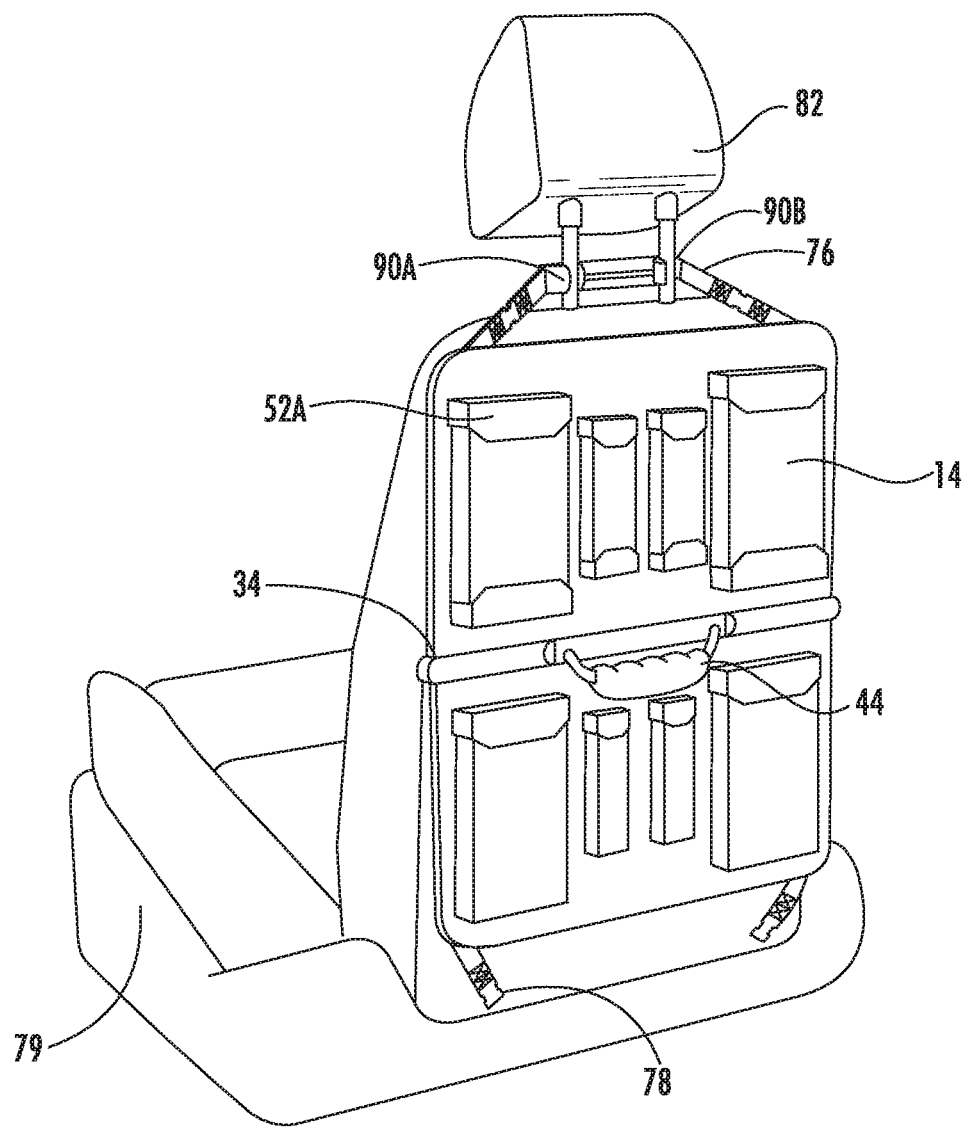
FIG. 15 illustrates the illustrates the portable organization bag with removable pockets shown in FIG. 13 secured to a head rest of a vehicle seat.
Figure 16:
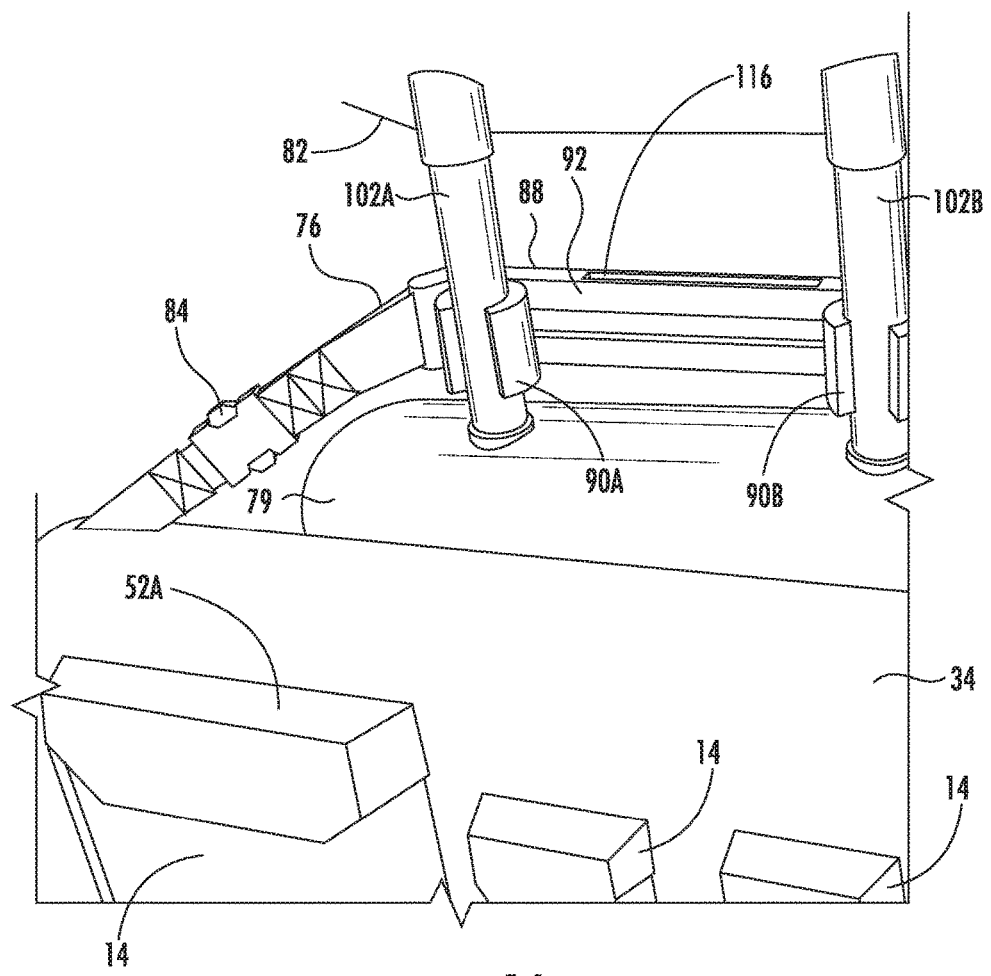
FIG. 16 is a close up view of the portable organization bag with removable pockets secured to a portion of the vehicle head rest.

FIGS. 13-18 illustrate the portable organization bag with removable pockets 10 which is adaptable to be secured to a portion of a vehicle seat that has a headrest or to a portion of a seat that does not have a headrest. As illustrated in FIG. 13, the main body 12 of the portable organization bag with removable pockets 10 contains a plurality of individual pockets 14 sized and shaped to receive and store objects as described previously. While the individual pockets 14 have been described as being removably attached to the main body 12, one or more of the individual pockets 14 may be secured to the main body 12 in a manner they are not removable. Plate 34 separates the main body 12 into the first portion 36 and the second portion 38. Each of the portions, the first portion 36 and the second portion 38, contain one or more pockets 14. Because plate 34 acts both as a structural component and as a hinge to allow the main body 12 to be folded and configured as a briefcase or messenger bag, see FIG. 14, pockets 14 may be designed to have directional flaps to enclose the pockets in either configuration. Each of the pockets 14 illustrated in FIG. 14 contains flaps 52A at one end, 53 of each pocket 14. This configuration allows a user to open the flap 52 to retrieve the contents inside of the pocket 14 and to close the flap 52A to prevent the objects from falling out during, for example, transportation. Several of the pockets 14 may contain a second flap 52B, positioned at the end 55 opposite to flap 52A. Flaps 52A and 52B allow for the pockets 14, which may be oriented in a different direction as the portable organization bag with removable pockets 10 is folded into the second position, to maintain its function of providing a mechanism to open and close the pocket 14. To aid in transporting the portable organization bag with removable pockets 10 when in the folded position, handle 44 may be attached to plate 34.

Securing members, shown as straps 76 and 78, provide a mechanism for securing the portable organization bag with removable pockets 10 to one or more portions of a vehicle seat 79. Strap 76 attaches to a first end 80 of the vehicle seat and is designed to secure to a head rest 82, or to a portion of a vehicle seat that does not contain a head rest. Strap 76 includes connecting members, illustrated herein as side release buckle 84 and 86, see also FIGS. 16 and 17. Strap 76 may also contain a center back seat securing support structure 88, see FIG. 16 or FIG. 18. The center back seat securing support structure 88 may be a plastic plate that contains one or more head rest clamping members 90A and 90B positioned on an inner surface 92. The head rest clamping members 90A and 90B are configured exactly the same. The head rest clamping member 90A comprises a body 93 having a first end 94 and second end 96. The first end 94 and the second end 96 are separated by a space 98, thereby exposing an interior region 100. The interior region is sized and shaped to receive a portion of the head rest 82. As an illustrated example, the main body 92 is shown having a generally cylindrical shape so that the interior can receive a cylindrical head rest post 102A and 102B (see FIG. 16). The cylindrical shape of body 90A is illustrative only. The head rest clamping member 90A may be made of a flexible or semi-flexible material so that as a user places it onto the head rest mounting post 102A, the first end 94 and the second end 96 move away from the interior region 100, and snap back to its original shape as the head rest mounting post 102A rests within the interior region 100.

Figure 17:
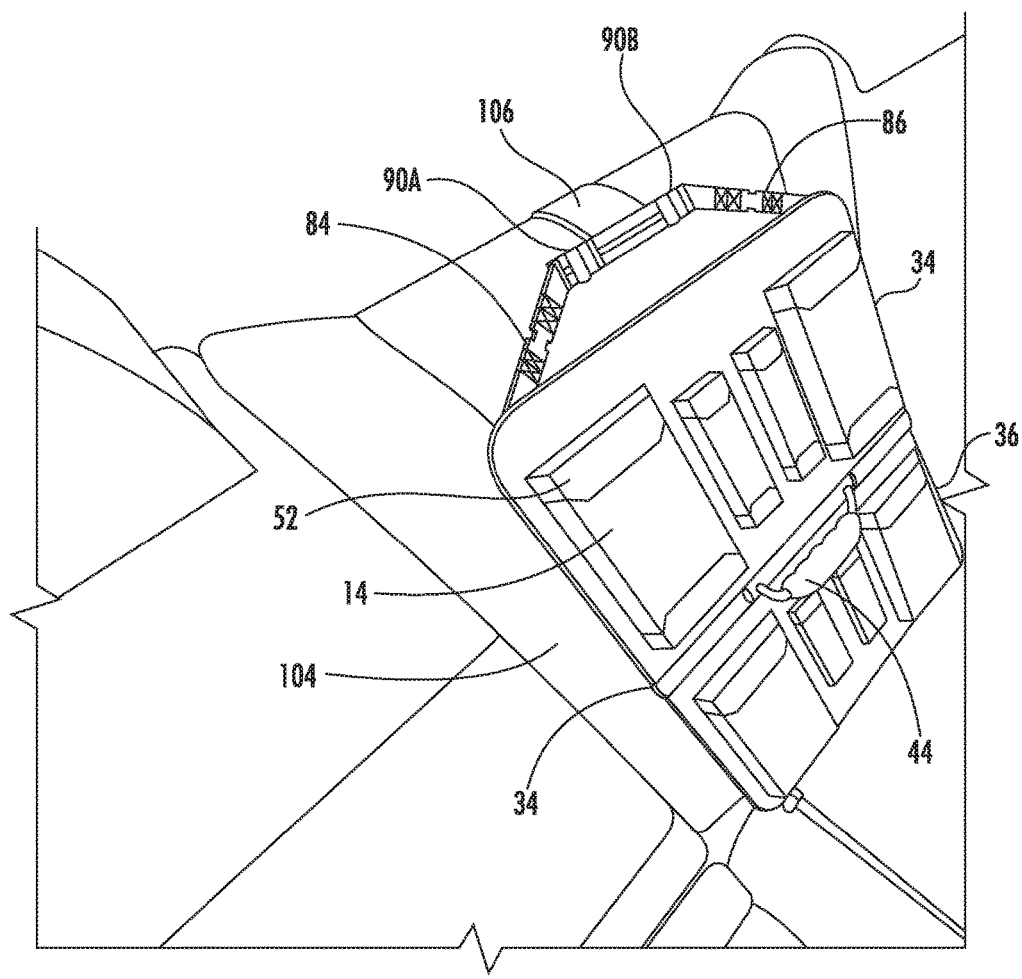
FIG. 17 illustrates the portable organization bag with removable pockets shown in FIG. 13 secured to a portion of the vehicle seat which does not have a head rest.
Figure 18:
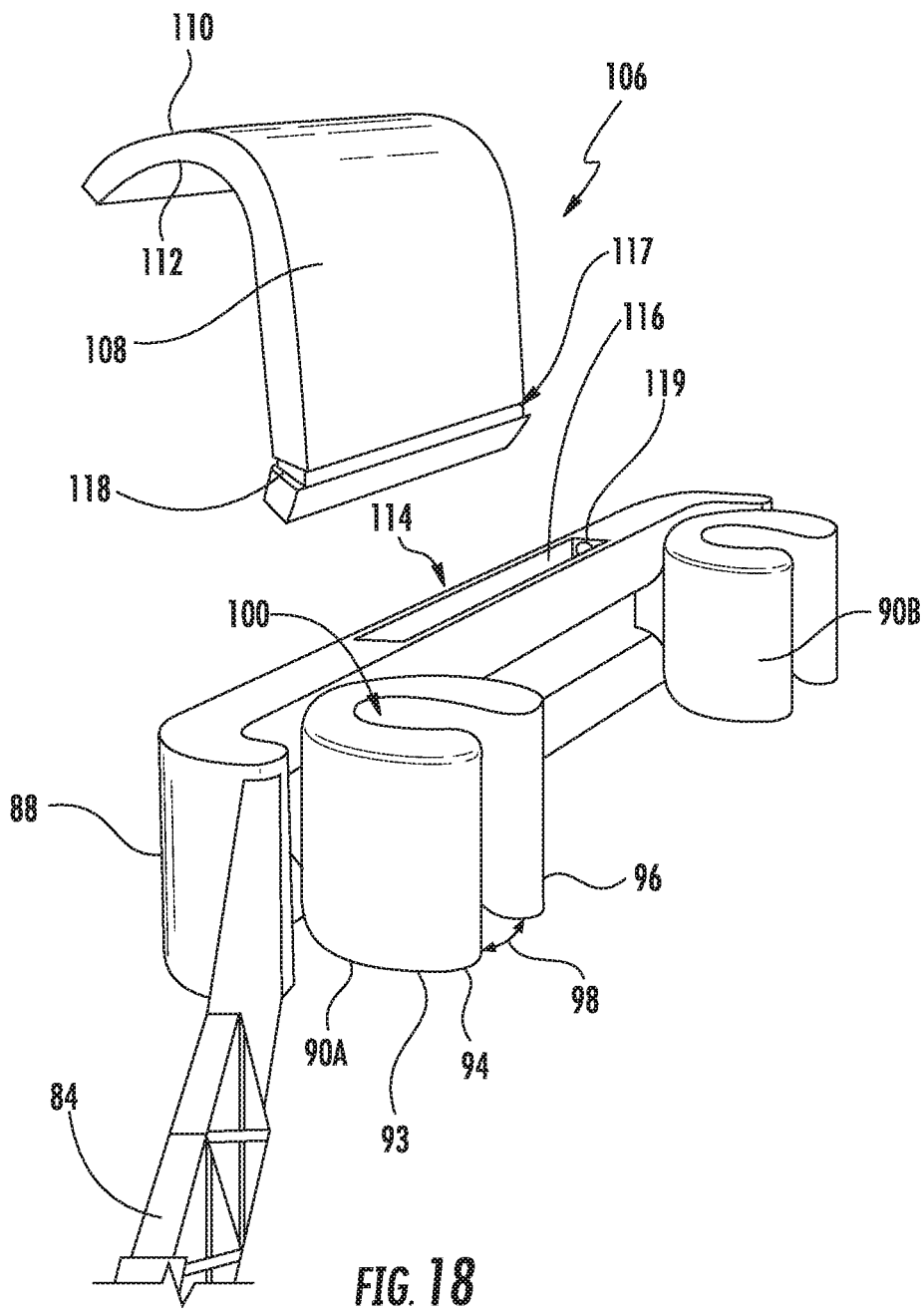
FIG. 18 is a close up view of the components that provide securing of the portable organization bag with removable pockets to a portion of the vehicle seat which does not have a head rest.

To aid in securing the portable organization bag with removable pockets 10 to a seat that does not contain a head rest, such as a center back seat chair 104, see FIG. 17, the portable organization bag with removable pockets 10 may contain a center back seat chair engagement member 106. The center back seat chair engagement member 106 comprises a hook shaped body 108, see FIG. 18, with the hooked end 110 having surface with a curvature 112 sufficient enough to engage with a curvature associated with the center back seat chair 104, see FIG. 17. The center back seat chair engagement member 106 may be integrally formed to the center back seat support structure 88. Alternatively, the center back seat chair engagement member 106 may be configured to secure to a center back seat chair receiving member 114 positioned or formed within the center back seat securing member 88. The center back seat chair receiving member 114 is illustrated as a slotted region 116 cut into the center back seat securing member 88 and sized and shaped to receive and hold, through for example, a friction or snap fit, with the bottom portion 118 of the hook shaped body 108. A hook shaped clip 117 may be used to removably snap into a recessed area or slotted portion 119 located within the center back seat chair receiving member 114. The slotted portion 119 is sized and shaped to receive the hook shaped clip 117.

Figure 19:
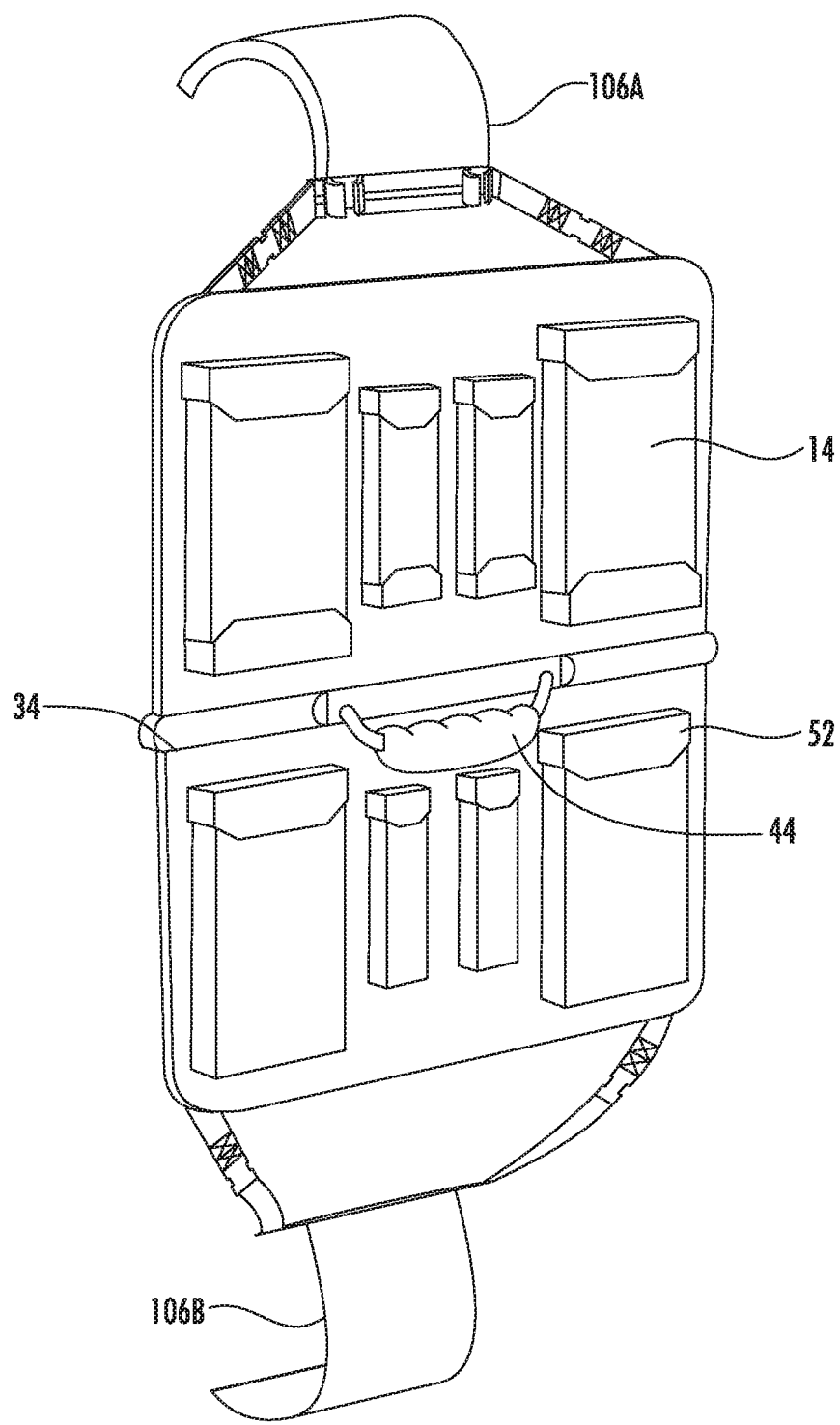
FIG. 19 illustrates the portable organization bag with removable pockets in which the bag contains multiple center back seat chair engagement members.
Figure 20:
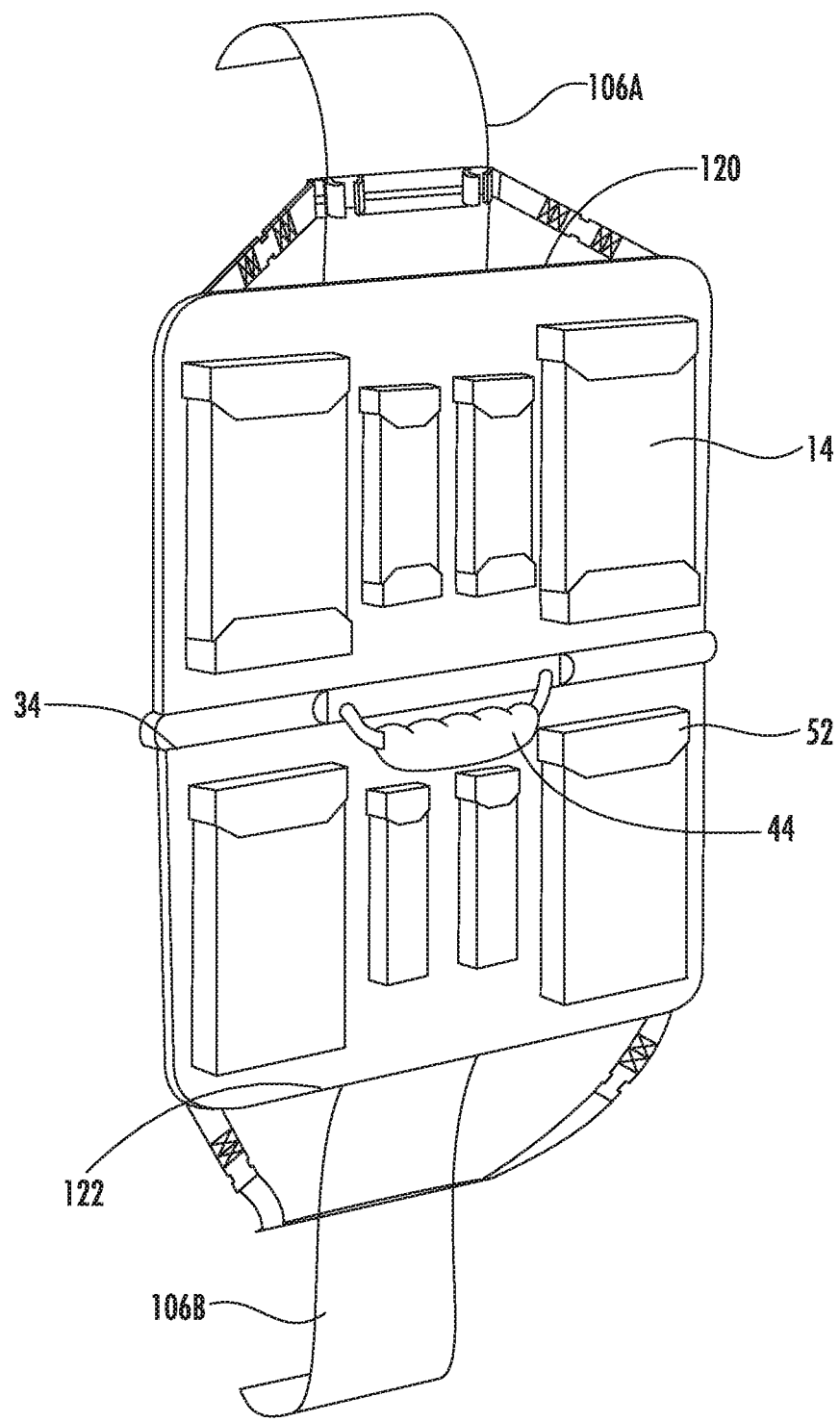
FIG. 20 illustrates the portable organization bag with removable pockets in which the bag contains multiple center back seat chair engagement members secured to the main body of the portable organization bag with removable pockets.

FIGS. 19-28 illustrate the portable organization bag with removable pockets 10 having additional features. FIG. 19 illustrates the portable organization bag with removable pockets 10 having multiple center back seat chair engagement members 106, referred to individually as 106A and 106B. Center back seat chair engagement member 106A can be secured to a top portion of a center back seat, and center back seat chair engagement member 106B can be secured to a bottom portion of the center back seat. As illustrated in FIG. 19, the center back seat chair engagement members 106A and 106B are supported by the center back seat support structure 88. Alternatively, the center back seat chair engagement members 106A and 106B may be secured to the top end 120 of the portable organization bag with removable pockets main body 12 or the bottom end 122 of the portable organization bag with removable pockets main body 12, see FIG. 20.

Figure 21:
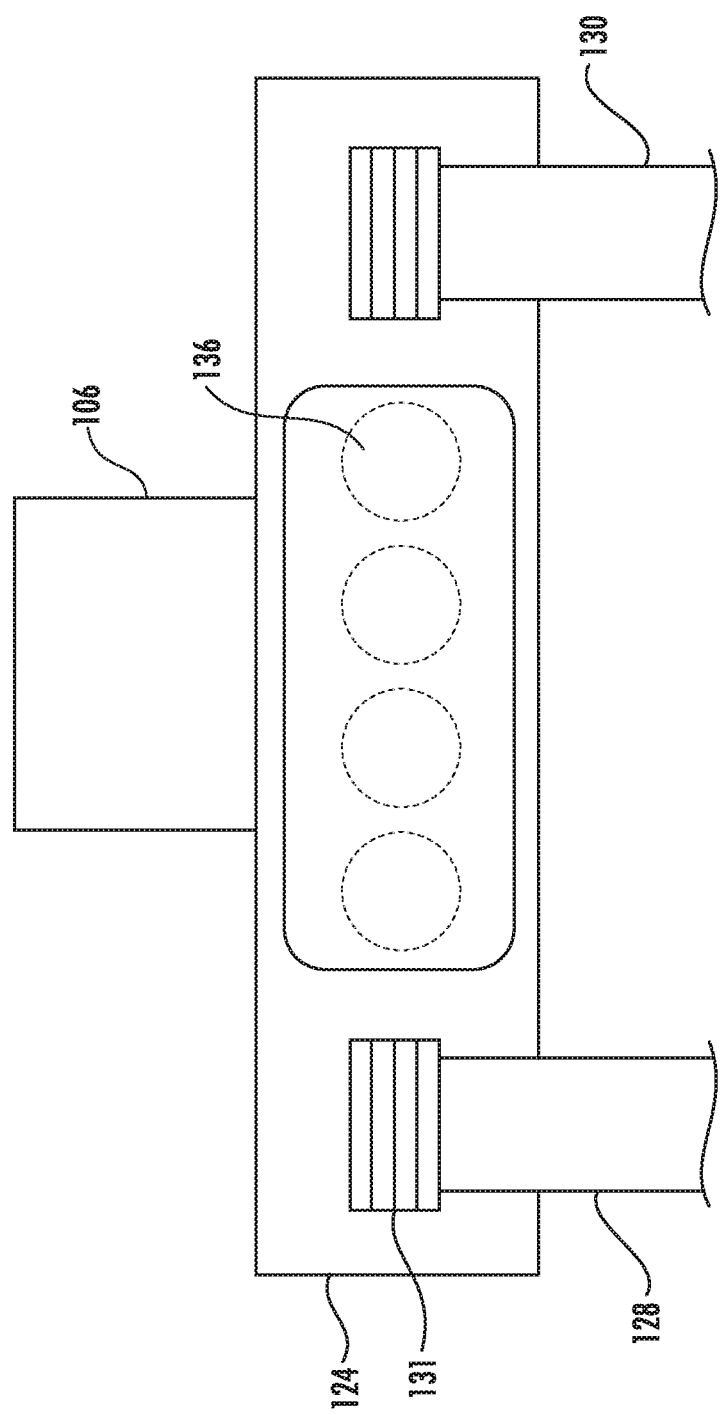
FIG. 21 illustrates a center back seat chair engagement member with a bottom panel.
Figure 22:
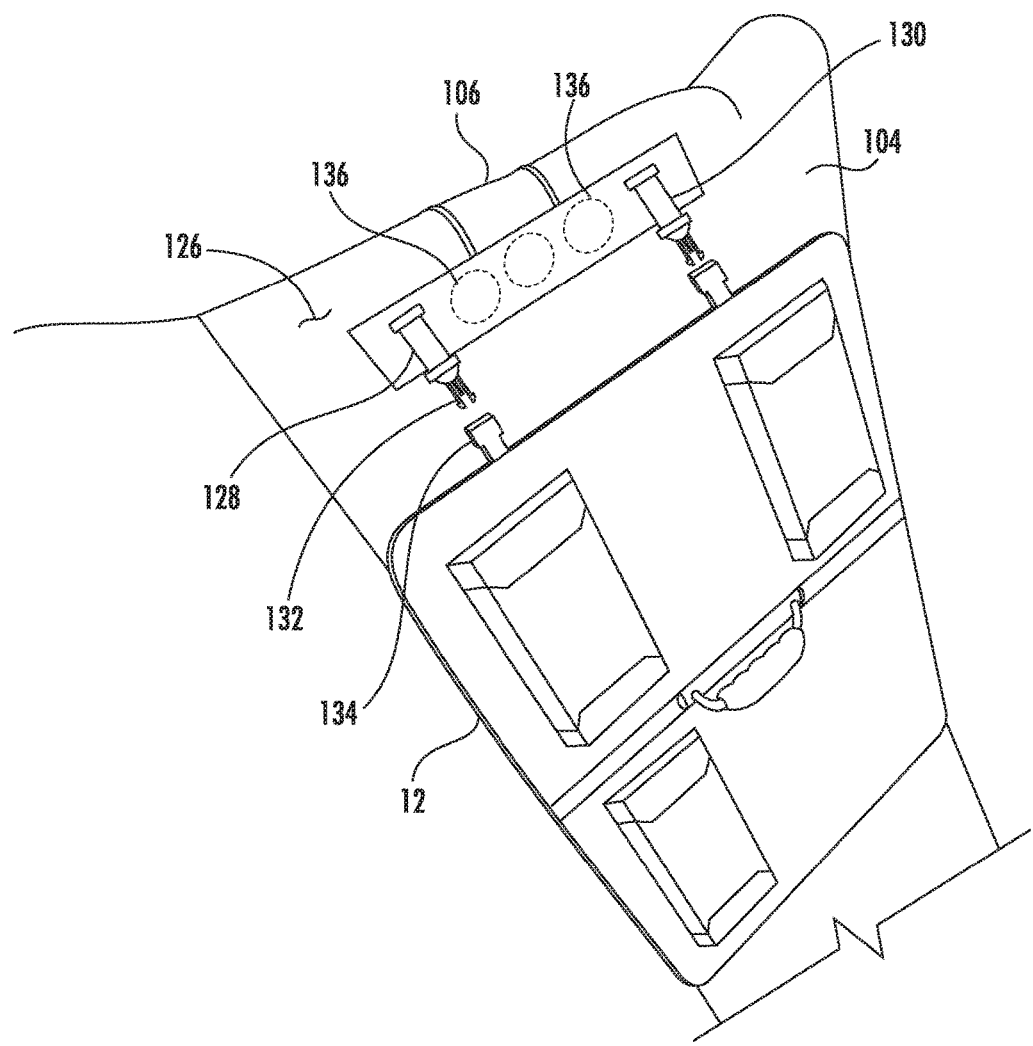
FIG. 22 illustrates a center back seat chair engagement member with a bottom panel secured to a center back seat chair.
Figure 23:
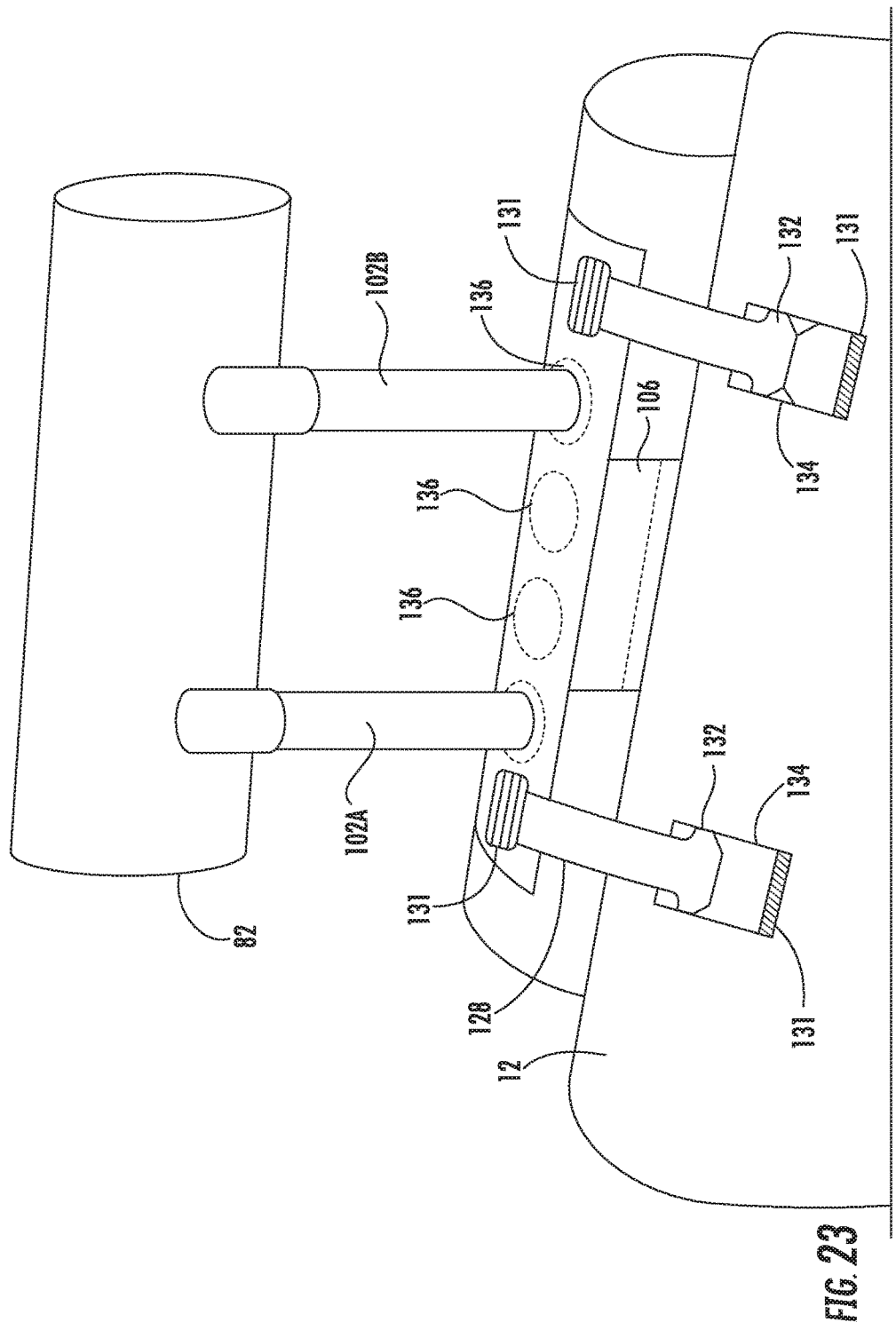
FIG. 23 illustrates the center back seat chair engagement member with a mounting bracket panel secured to a car seat with a head rest.
Figure 24:
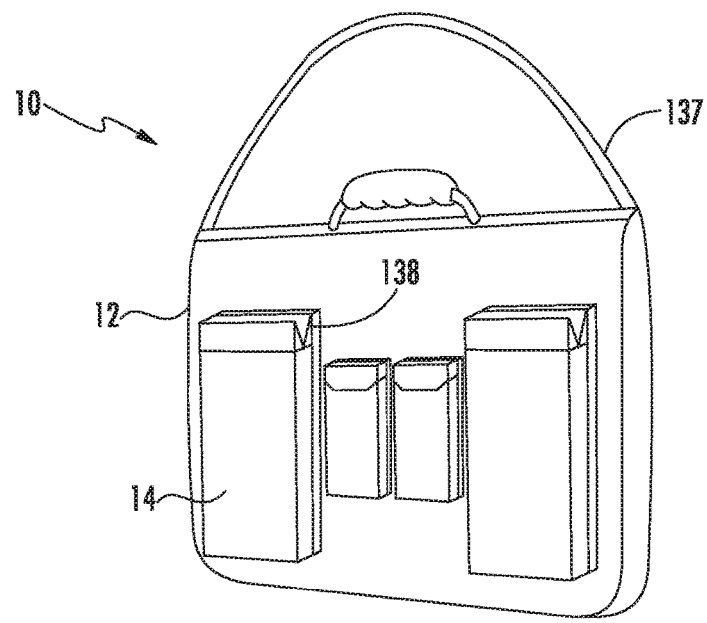
FIG. 24 illustrates the portable organization bag with removable pockets with expandable pockets.

FIG. 21 illustrates the center back seat chair engagement members 106 secured to, or integrally formed to, a mounting bracket panel 124. The mounting bracket panel 124 is configured to rest against the back seat surface 126 of the center back seat chair 104. Straps 128 and 130 are secured, through, for example, stitching 131, to the mounting bracket panel 124. At the end of the straps 128 and 130 are male or female connecting members configured to corresponding female or male connecting members positioned (and secured using stitching 131) on the back surface of the portable organization bag with removable pockets main body 12, see FIG. 22. As shown in FIG. 22, the male/female connecting members may be, for example, a side release buckle having a latch 132 lockable into a latch body 134. In this configuration, the portable organization bag with removable pockets main body 12 locks secures to the center back seat chair engagement members 106. The mounting bracket panel 124 may contain one or more cut out portions 136 sized and shaped to engage with a seat head rest post 102A or 102B, see FIG. 23. This allows the center back seat chair engagement members 106 secured with the bottom panel 124 to engage and secure to a car seat having a head rest. When in use with a head rest 82, the center back seat chair engagement members 106 can be flipped.

Figures 25, 26, 27:
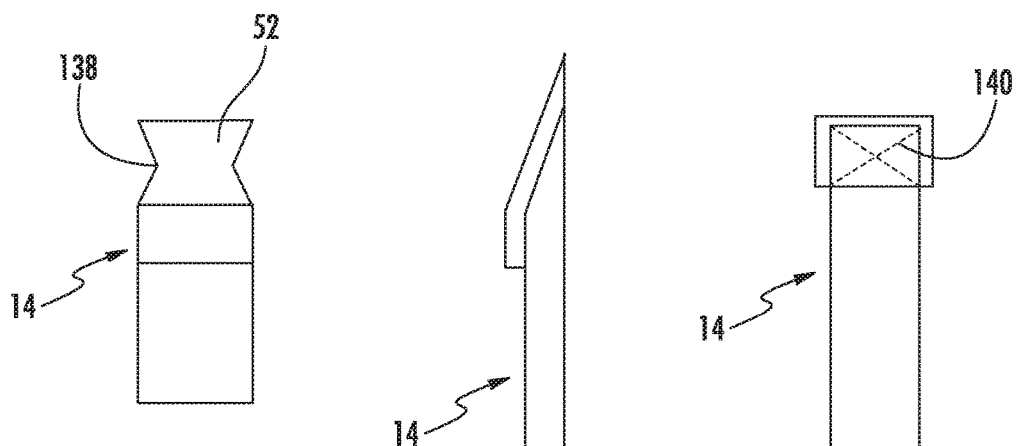
FIG. 25 is a front view of the expandable pocket.
FIG. 26 is a side view of the expandable pocket in the non-expanded state.
FIG. 27 is a side view of the expandable pocket in the expanded state.

FIGS. 24-27 illustrate the portable organization bag with removable pockets 10 configured to have pockets 14 that can expand. Pockets 14 may be configured to contain an elastic material 138 or flaps, enabling the pocket 14 to expand or contract when needed and maintain material stored within from falling out. FIG. 25 shows a front view of the pocket 14 with a flap or folded material 138. FIG. 26 illustrates a side view of the pocket 14 in non-expanded configuration. FIG. 27 illustrates a side view of the pocket 14 in the expanded configuration, with the dotted lines 140 representing the folded material 138 in a non-folded configuration. The portable organization bag with removable pockets 10 is also shown with a strap 137, see FIG. 24.

Figure 28:
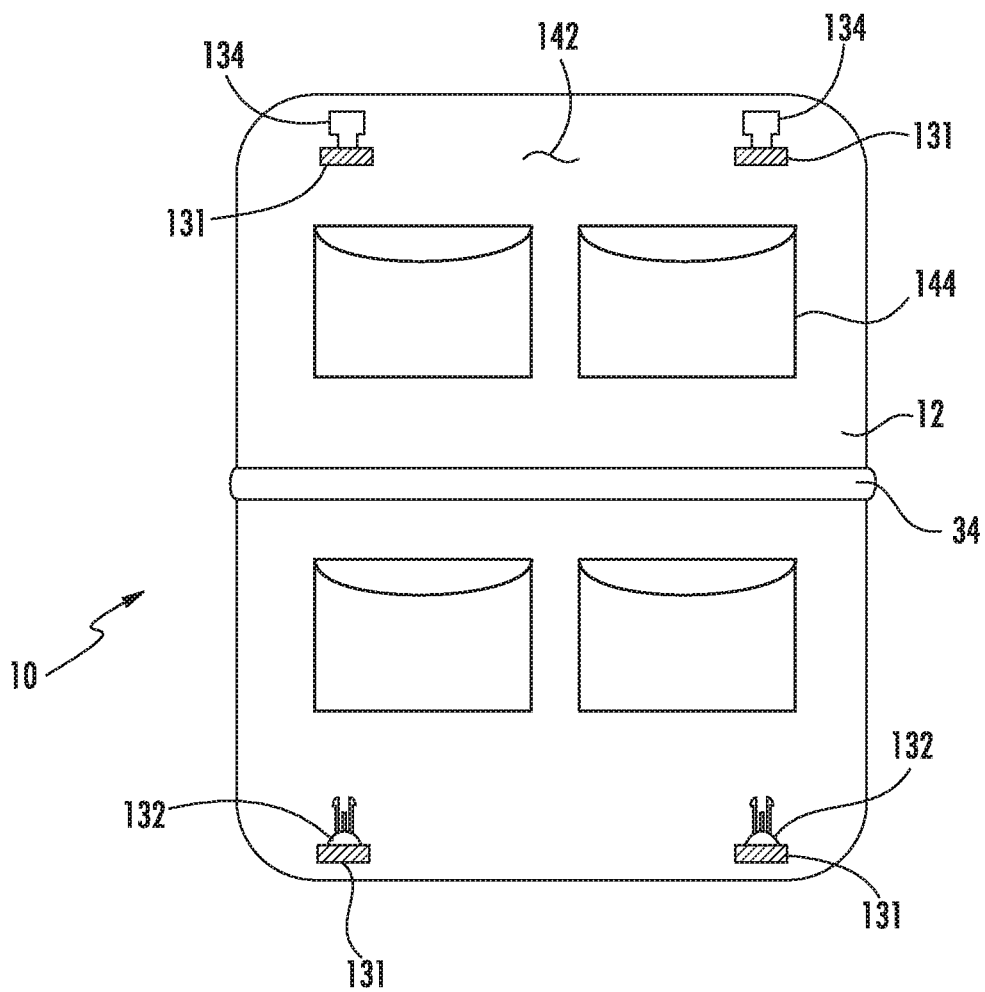
FIG. 28 illustrates the portable organization bag with removable pockets having secondary pockets.

FIG. 28 illustrates the portable organization bag with removable pockets 10 in which the back surface 142, i.e. the surface that does not contain the main pockets 14, contains one or more additional secondary pockets 144. The secondary pockets 144 may be removable. FIG. 28 also illustrates the male/female connecting member, such as the side release buckle latch 132 and side release buckle latch body 134. The side release buckle latch 132 and the side release buckle latch body 134 may be secured to the portable organization bag with removable pockets 10 through stitching 131.

Figure 29:
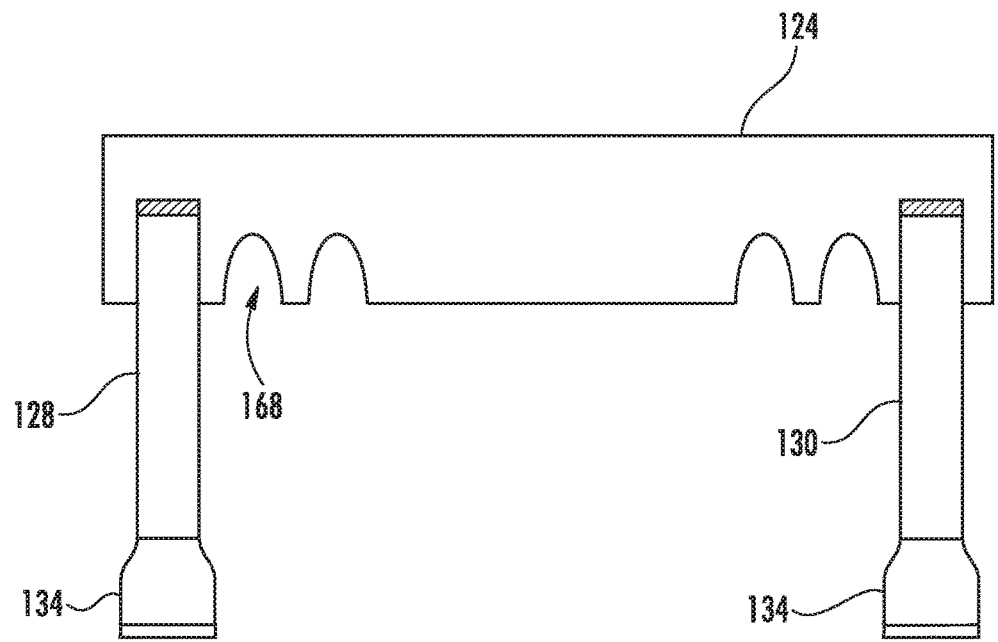
FIG. 29 illustrates an embodiment of the mounting bracket panel.
Figure 30:
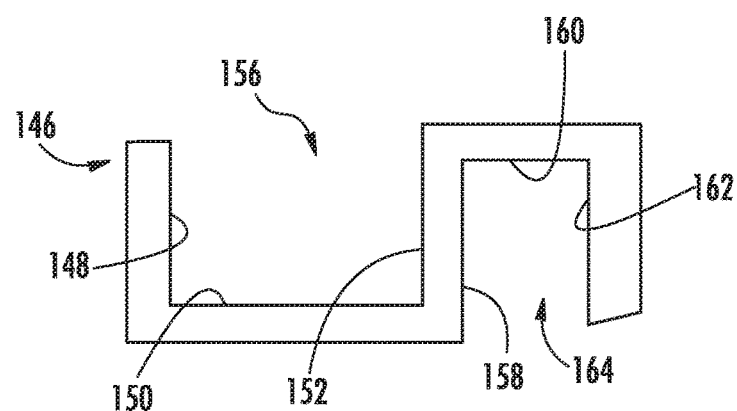
FIG. 30 illustrates a clip configured for securing the mounting bracket panel to a vehicle seat.
Figure 31:
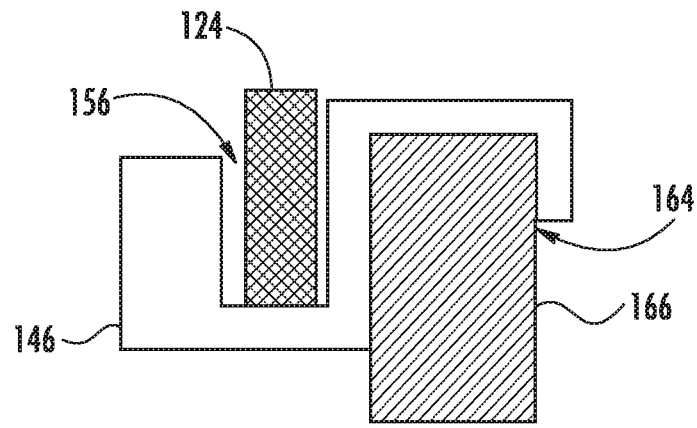
FIG. 31 is a side view of the mounting bracket panel secured to a vehicle seat with the clip.
Figure 33:
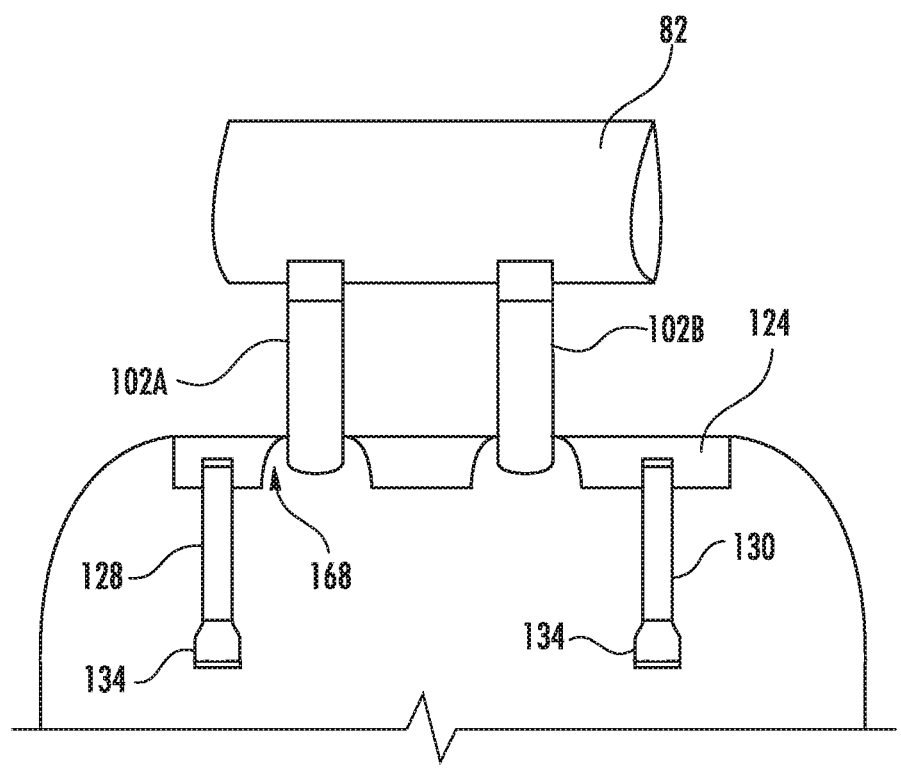
FIG. 33 illustrates the mounting bracket panel shown in FIG. 29 secured to a car seat head rest.
Figure 32:
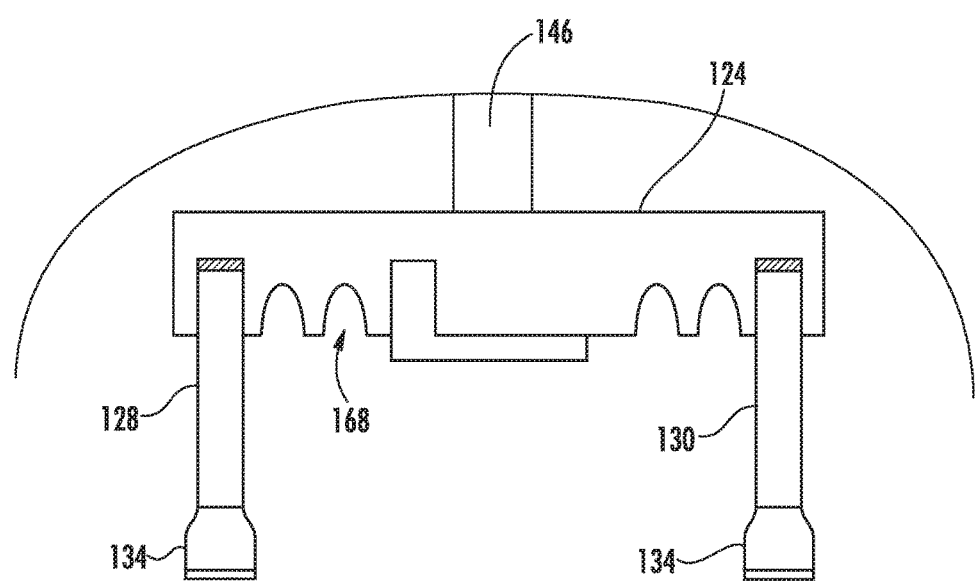
FIG. 32 illustrates the mounting bracket panel shown in FIG. 29 secured to a center back seat.

FIGS. 29-33 illustrate the portable organization bag with removable pockets 10 utilizing a mounting bracket panel 124 configured without the center back seat chair engagement member 106 integrally formed or attached thereto, see FIG. 29. To engage with a portion of a car seat, a clip 146 is configured to allow the mounting bracket panel 124 to slide thereon. As illustrated in FIG. 29, the clip 146 has a plurality of mounting bracket panel surfaces 148, 150, and 152 arranged to form a partially enclosed mounting bracket panel receiving area 156. Clip 146 further includes a plurality of vehicle seat surfaces 158, 160, and 162 arranged to form a partially enclosed mounting bracket panel receiving area 164. Such configuration allows the clip 146 to simultaneously engage a portion of a car seat 166 (top or bottom surfaces) and the mounting bracket panel 124, see FIG. 31 and FIG. 32. To secure the mounting bracket panel 124 to a car seat head rest 82, the user may simply align the cut-out portions 168 with the head rest posts 102A and 102B, see FIG. 33. Straps 128 and 130 with male or female connecting members configured to corresponding female or male connecting members, shown with the side release buckle latch body 134 can be used to secure the main body 12 to the mounting bracket panel 124.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An organization and storage device comprising:
    a main body traversable between a first securing position configured to be securable about a vehicle car seat and a second transportable position configured to be transported away from said vehicle car seat when unsecured from said vehicle car seat, said main body comprising an inner component made of a flexible, hard material, an outer component covering said inner component, and one or more first fastening members configured to secure at least one removable pocket to said main body; and
    a plate positioned in said main body and arranged to separate said main body into a main body first portion and a main body second portion, said main body first portion or said main body second portion is foldable about said plate to form said second transportable position wherein said main body is transportable from said vehicle as a carrying bag in which said plate forms the top portion of the carrying bag,
    said at least one removable pocket sized and shaped to receive and hold one or more objects therein, said at least one removable pocket having at least one second fastening member configured to engage or interact with said first fastening member, wherein engagement or interaction with said first fastening member secures said at least one removable pocket to said main body and disengagement or lack of interaction with said first fastening member allows said at least one removable pocket to be independently removed from said main body.

2. The organization and storage device according to claim 1 wherein said at least one removable pocket contains a first flap sized and shaped to cover a pocket opening at a first end.

3. The organization and storage device according to claim 1 wherein said at least one removable pocket contains a second flap sized and shaped to cover a pocket opening at a second end.

4. The organization and storage device according to claim 1 wherein said main body is configured to be secured to a vehicle seat having a head rest.

5. The organization and storage device according to claim 4 further including at least one head rest clamping member configured to secure to a head rest mounting post.

6. The organization and storage device according to claim 1 wherein said main body is configured to be secured to a vehicle center back seat chair.

7. The organization and storage device according to claim 6 further including a center back receiving support structure configured to receive a center back seat chair engagement member.

8. The organization and storage device according to claim 7 further including a center back seat chair engagement member configured to engage with a portion of a center back seat chair.

9. An organization and storage device comprising:
a main body comprising an inner component made of a hard material surrounded by an outer component comprising a first fastening member configured to engage with one or more removable pockets, said main body having a first portion and a second portion, said first portion separated from said second portion by a hinge comprising a plate extending the entire width of said main body, wherein said main body first portion or said main body second portion is configured to be foldable about said plate, wherein said main body is transportable from said vehicle as a carrying bag in which said plate forms a top portion of the carrying bag,
said main body traversable between a first securing position and a second transportable position; and
said one or more removable pockets sized and shaped to receive and hold one or more objects therein, each of one or more removable pockets having at least one second fastening member configured to engage with said first fastening member, wherein engagement with said first fastening member secures said at least one or more removable pockets to said main body and disengagement with said first fastening member allows said at least one or more removable pockets to be independently removed from said main body.

10. The organization and storage device according to claim 9 wherein said at least one or more removable pockets contain a first flap sized and shaped to cover a pocket opening at a first end.

11. The organization and storage device according to claim 9 wherein said at least one or more removable pockets contain a second flap sized and shaped to cover a pocket opening at a second end.

12. The organization and storage device according to claim 9 wherein said main body is configured to be secured to a vehicle seat having a head rest.

13. The organization and storage device according to claim 12 further including at least one head rest clamping member configured to secure to a head rest mounting post.

14. The organization and storage device according to claim 9 wherein said main body is configured to be secured to a vehicle center back seat chair.

15. The organization and storage device according to claim 14 further including a center back receiving support structure configured to receive a center back seat chair engagement member.

16. The organization and storage device according to claim 15 further including a center back seat chair engagement member configured to engage with a portion of a center back seat chair.

17. The organization and storage device according to claim 9 further including a handle.

* * * * *